INVENTORS
BEN D. CONGER
ALFRED G. TONNESSEN
BY
THEIR ATTORNEY

INVENTORS
BEN D. CONGER
ALFRED G. TONNESSEN
BY *[signature]*
THEIR ATTORNEY

INVENTORS
BEN D. CONGER
ALFRED G. TONNESSEN
BY *Mewyn D. Young*
THEIR ATTORNEY

Feb. 3, 1970       B. D. CONGER ET AL       3,493,873
RATE RESOLVER CIRCUITRY WITH VOLTAGE LIMITING
Filed Nov. 22, 1966                          4 Sheets-Sheet 4

INVENTORS
BEN D. CONGER
ALFRED G. TONNESSEN
BY
THEIR ATTORNEY

United States Patent Office 3,493,873
Patented Feb. 3, 1970

3,493,873
RATE RESOLVER CIRCUITRY WITH VOLTAGE LIMITING
Ben D. Conger, Neptune, and Alfred G. Tonnessen, Monmouth, N.J., assignors to Electronic Associates, Inc., Long Branch, N.J., a corporation of New Jersey
Filed Nov. 22, 1966, Ser. No. 596,325
Int. Cl. G06g 7/22
U.S. Cl. 328—142                2 Claims

ABSTRACT OF THE DISCLOSURE

A rate resolver employing an integrating circuit to generate as an output signal a ramp function varying between specified voltage levels and means to detect the occurrence of the output signal magnitude equaling one of the specified levels in response to which a resistive circuit is switched into parallel electrical connection with the integrator to reduce its gain, thus lowering the output signal magnitude until it is less than the specified voltage level.

---

This invention relates to improved rate resolver circuitry for employment in analog computation and, more particularly, to improved means within such a resolver circuit for limiting unwanted voltage excursions during a change in operational conditions.

Resolver circuits are adapted to generate a trigonometric function as an output signal. This function may be said either to be the resolution of a vector along respective rectangular cartesian coordinates; or to correspond to a vector composition or the inverse resolution of a vector from its respective components. The former case is really representative of a transformation from polar point coordinates to rectangular cartesian coordinates while the latter case is representative of the inverse transformation or a transformation from rectangular cartesian coordinates to polar coordinates. When the respective input signals vary as a function of time or are representative of the time rate of change of the input variables, the resolved circuitry is referred to as a "rate resolver," and the output signal may be representative of a periodically varying function. Both the vector resolvers and the rate resolvers find important application in both static and dynamic trajectory computation and navigation as well as aircraft and missile flight simulation.

Resolver mechanisms employed in early analog computers were of the mechanical or electro-mechanical type such as rotating potentiometers that could be precisely positioned by servomechanisms and, in the case of rate resolution, could be held in a fixed position whenever it was desired to fix or hold the conditions under simulation or computation. However, precision servomechanisms are relatively slow by today's standards as well as costly because of the precision machining required for the mechanical parts.

All electronic resolver circuits have been developed which are adapted to receive an input signal representative of the time rate of change of a given variable and generate a ramp signal representative of that variable and a function generating network is provided to create a periodically varying signal as a function of that variable. For the generation of trigometric functions, the ramp signal may vary from a negative reference voltage level to a positive voltage reference level which when detected by comparator circuitry causes the ramp generator to then become negative-going, thereby providing constant generation of the function in question throughout the next quadrant. The output signal for this next quadrant will be inverted relative to the preceding quadrant and appropriate circuitry may be provided to correct this inversion. With such quadrant switching techniques, a function can be generated throughout a plurality of quadrants.

With the above-described continuous or rate resolver, a hold condition may be initiated by electrically disconnecting a component in the system and while there may be some slight drift of the output signal, this may be corrected for during final analysis of the generated function. However, if the hold condition should be initiated when the resolver is about to switch from one quadrant to the next, subsequent drift will cause the resolver to exceed its voltage limits. Furthermore, similar unwanted voltage excursions may occur if the input signal were to be reversed in polarity at the time of quadrant switching.

It is then an object of the present invention to provide an improved rate resolver circuitry for employment in analog computation.

It is another object of the present invention to provide an improved rate resolver circuitry that may be placed in a hold condition without unwanted voltage drift effects.

It is still another object of the present invention to provide an improved rate resolver circuitry which may be placed in a hold condition or which may receive an input signal of reversing polarity without causing the output signal to exceed described voltage limits.

In the case of a rate resolver or continuous operation of a rate resolver, the input signal is usually a constant voltage level representative of the rate at which the periodic function is to be generated, and this signal is supplied first to an integrator to provide the appropriate ramp functions that are not to exceed certain limiting values. It is the output signal of this integrator that is fed to the comparator to initiate the quadrant-switching when it is desired to generate the required output function through a plurality of quadrants. Since comparator circuits are already provided for such quadrant-switching, they may also be employed to initiate corrective action if the output signal of the integrator should exceed predetermined levels. This may be done by connecting a resistive network in parallel with the capacitor of the integrator, which connection may be made by appropriate gates such as to initiate a partial discharge of the capacitor and thereby limiting any further rise of the output signal of the integrating circuit.

A feature then of the present invention resides in a rate resolver employing an integrating circuit to generate a ramp function between specified voltage levels and a means to detect the occurrence of the ramp function exceeding those levels in response to which a resistive circuit is switched to shunt relation with the integrator.

These and other objects, advantages, and features of the present invention will become more readily apparent from the following description when reviewed in conjunction with the drawings wherein.

Figure 1:
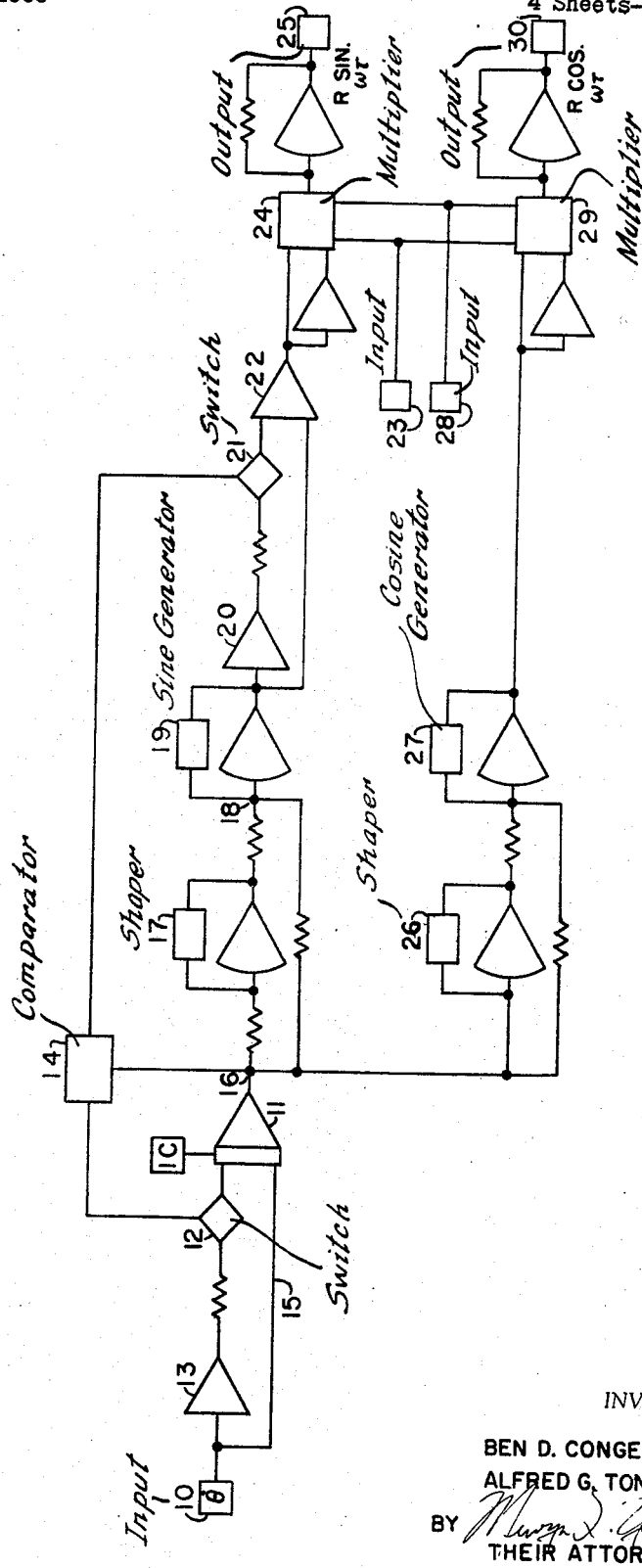
FIGURE 1 is a schematic diagram of a rate resolver employing the present invention.
Figure 3:
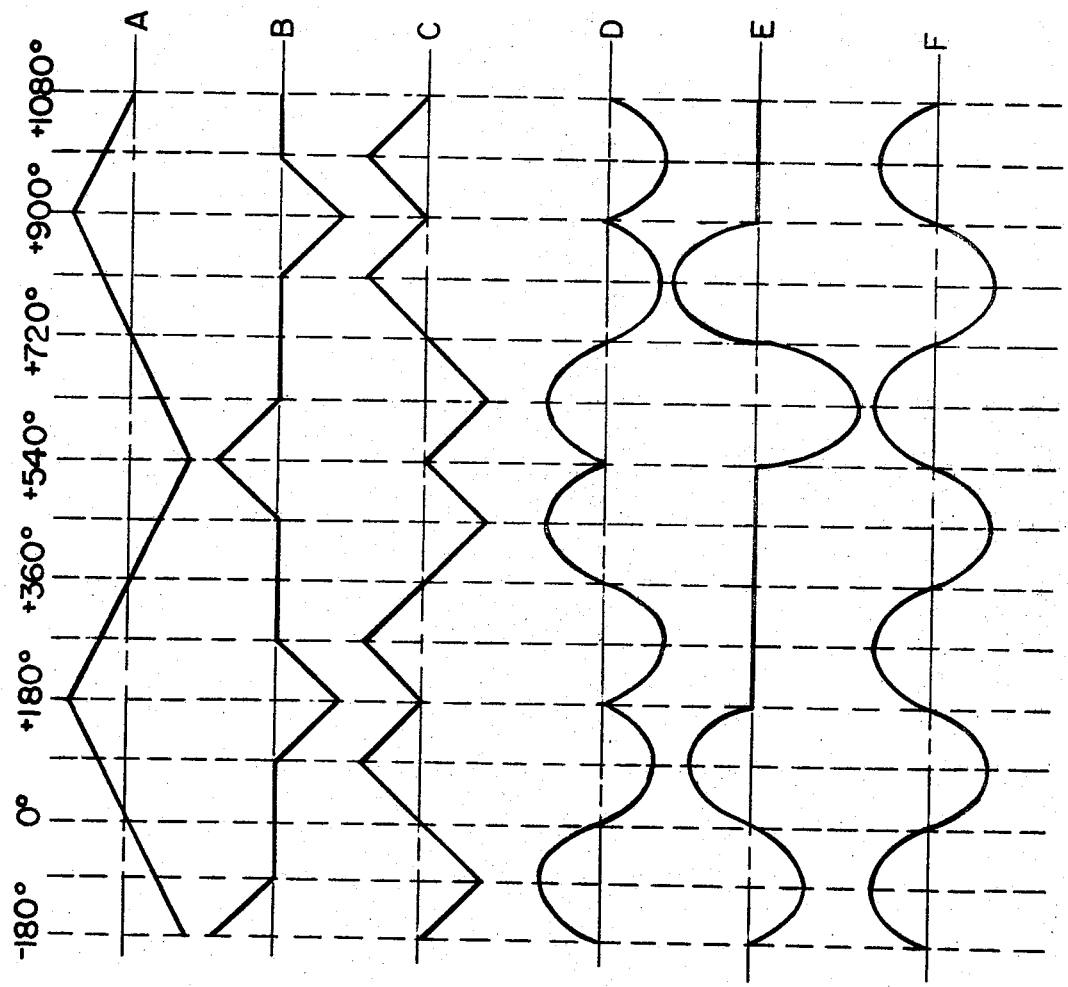
FIGURE 3 is a graphical representation of the respective wave forms associated with the rate resolver employing the present invention.

Referring now to FIGURE 1, there is illustrated therein a rate resolver of the type anticipated for employment of the present invention which will now be briefly described to provide a better understanding of the present invention. In FIGURE 1, a voltage representative of the rate of continuous resolution of a vector is applied to terminal 10 for amplification and presentation to integrator 11 by way of electronic switch or gate 12, which is set to be conducting during this portion of operation. Because of the inversion and amplification by amplifier 13, the signal presented to integrator 11 has a gain of two and is opposite polarity into a similar signal supplied to integrator 11 by conductor 15. The resultant output of integrator 11 is a ramp as indicated in FIGURE 3 by wave form A. An initial condition voltage has been supplied to integrator 11 so that the starting point of the ramp will be from a negative voltage level, such as —90 volts, with the slope of the ramp being proportional to the input voltage supplied to terminal 10. When the output of integrator 11 reaches a selected positive voltage limit, such as +90 volts, this condition is detected by comparator circuitry 14 in response to which electronic switch 12 is opened and the input signal at input terminal 10 is now transmitted to integrator 11 only by way of conductor 15 such as to cause the output signal of integrator 11 to be reversed and to have a negative slope. When the output signal of integrator 11 has reached a negative voltage reference level of —90 volts, this condition is again detected by comparator circuitry 14, which closes electronic switch 12 to again cause integrator 11 to generate a positive ramp signal. In this manner, the output signal of integrator 11 at junction 16 and supplied to subsequent wave-shaping elements will be in the form of a series of ramps which are alternately positive and negative, positive, and so forth. This signal in turn is supplied to shaping network 17 which may be a specific diode function generator so adapted that the output of the network will drop from an initial condition to zero during a first portion of the ramp generation, remain at zero voltage level during two subsequent portions of the ramp generation and then drop to a negative reference value during the fourth portion of the ramp generation. The output of shaping network 17 will be similar but inverted when the ramp signal applied thereto has an opposite slope such that the signal presented from shaping network 17 to summing junction 18 will be as illustrated in FIGURE 3 by wave form B.

At the same time, the output ramp signal of integrator 11 is presented directly to summing junction 18 such that the combined signal appearing at summing junction 18 will be as indicated by wave form C of FIGURE 3. This combined signal is then applied to sine generator 19, which may be of a standard diode function generator type, to generate a full-cycle sine wave during the generation of one continuous segment of the ramp function by integrator 11. It will be noted from the wave form D of FIGURE 3 that the second full-cycle sine wave will be inverted because of the form of the corresponding input signal to the sine generator as indicated in FIGURE 3 by wave form C. To provide correction for such inversion during alternate cycles, the output signal of sine generator 19 is supplied to amplifier 20 having a gain of two and through electronic switch 21 to amplifier 22, which in this case merely serves as an inverter. The output signal of sine generator 19 is also supplied directly to amplifier 22, and switch 21 is activated by comparator circuit 14 to be conducting the same time switch 12 is conducting such that during a positive ramp generation by integrator 11 the output signal of sine generator 19 is both amplified with a gain of two and inverted by amplifier 20 and presented to inverter 22 and also directly supplied to inverter 22, the two wave forms partially cancelling one another to provide a complete cycle sine wave as indicated by wave form F, FIGURE 3. During the generation of a negative ramp by integrator 11 when neither switch 12 or 21 is conducting, the output signal of sine generator 19 is the only signal supplied to inverter 22 with the output signal from inverter 22 being a continuous sine wave as indicated by wave form F of FIGURE 3.

To provide the proper amplitude for the wave function, a separate input signal representative of this amplitude is supplied to input terminal 23 for presentation to multiplier 24, which may be of a type known in the art, with the resultant output signal at output terminal 25 being of the form $R \sin \omega t$. Similarly, separate circuitry including shaping circuit 26 and cosine generator 27 may be provided to generate the corresponding cosine function for which the amplitude signal is supplied from input terminal 28 to multiplier 29 to provide an output signal at output terminal 30 of the form $R \cos \omega t$.

Having thus described the principal features of a rate resolver such as the type employing the present invention, the particular manner in which the ramp voltage is prevented from exceeding specified voltage limits will now be described. As described above, such occurrence can normally occur if the input voltage signal representing the rate of vector resolution were to change polarity at the same time that the output signal from integrator 11 is changing slope from positive to negative or vice versa, or when the resolver circuitry were placed in a hold condition at that time. It will be readily understood that in the former case the changing of polarity or sign of the input voltage signal representing the rate of vector resolution would result in a signal of opposite sine being presented to integrator 11 and this would simply cancel out the effect of amplifying and inverting the signal supplied to integrator 11 by switch 12 such that even though switch 12 ceased conducting, the signal supplied to integrator 11 would still cause it to produce a ramp of the same slope. Similarly, if the resolver circuitry were placed in a hold condition when the output of integrator 11 is close to its limits, any drift of the output signal would not be prevented by the comparator circuit 14 which can only act to turn on or off the respective electronic switches 12 or 21. A particular reason why the hold condition may result in drift without the comparator circuit acting to correct it, is that the conductor supplying the input signal to the integrator is opened during the hold condition, thus isolating the integrator from the rest of the circuit.

Figure 2:
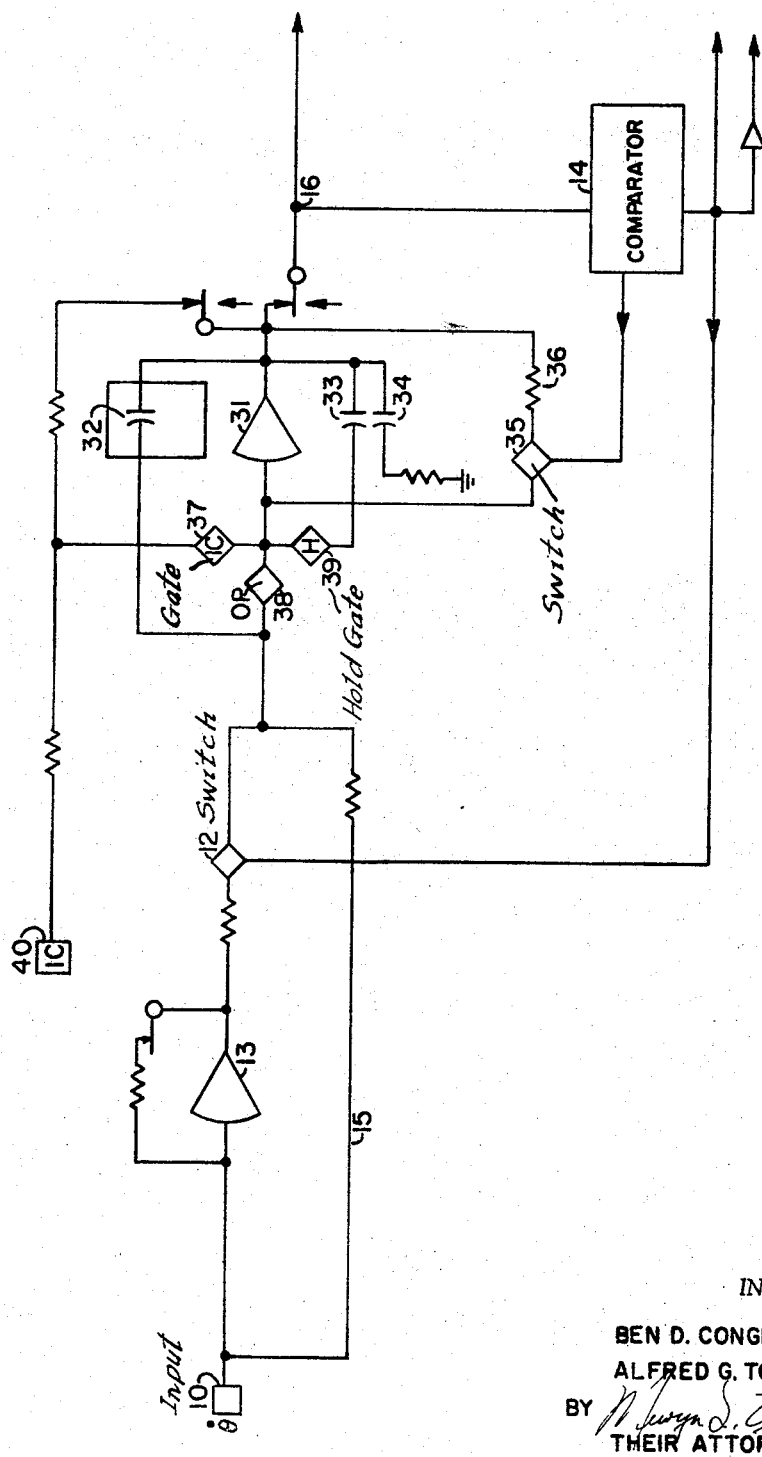
FIGURE 2 is a schematic diagram of the integrator circuitry of such a rate resolver employing the present invention.

Particular circuitry for preventing such unwanted drift or other excursions beyond the prescribed limits of operation of the integrator is shown in FIGURE 2.

Integrator 11 of FIGURE 1 includes amplifier 31 in parallel with capacitor 32 in the feedback path, the particular capacitance of which may be selected according to the required time scale. As shown in FIGURE 2, input terminal 10, amplifier 13, and a separate input conductor 15 serve the same purpose in FIGURE 2 as was described in relation to FIGURE 1. At the beginning of a resolution operation, initial condition gate 37, is set to be conductive and an appropriate initial condition voltage signal level is supplied to amplifier 31 from initial condition terminal 40. In the particular embodiment described, the value of this initial condition voltage is chosen to be —90 volts. When computation is to begin, initial condition gate 37 ceases to conduct and operation gate 38 is set for conductance for the generation of a positive ramp at terminal 16 as illustrated in both FIGURE 1 and FIGURE 2.

When the voltage at terminal 16 approaches an upper limit which in the present embodiment is chosen to be +90 volts, this condition is sensed by comparator 14 in response to which gate 12 is conditioned to cease conduction so that the signal now supplied to the integrator and more specifically to amplifier 31 is of such a value that the ramp being generated will be negative going as required for generation of appropriate output signal in the next quadrant. When the value of the voltage signal at terminal 16 again approaches —90 volts, this condition is again detected by comparator 14 in which case gates 12 and 21 are again set for conductance.

When a varying signal might be applied to terminal 10 and that input signal should change its polarity during a time of quadrant switching, it is possible for value of the voltage level at terminal 16 to exceed the limits that have been chosen. Furthermore, if the circuitry is placed in a hold condition by switching off operation gate 38 and placing hold gate 39 in the conducting state, it is possible for the drift of the amplifier 31 to exceed the prescribed voltage limits. To prevent such unwanted voltage excursions and additional feed back path is provided between the input and output terminals of amplifier 31 which path includes resistor 36 and electronic switch or gate 35, such that whenever the output voltage level at junction 16 reaches the normal operating limits of the amplifier, this condition will be detected by comparator 14 in response to which gate 35 is placed in a conducting condition to partially discharge the feedback condenser of integrating circuit. Since the condenser 32 or condenser 33, depending upon whether circuitry is in an operation mode, or a hold mode, will be either above or below a zero condition when it is required to discharge the respective condensers, the resultant discharge will always cause voltage applied there across to decrease in absolute value.

Figure 4:
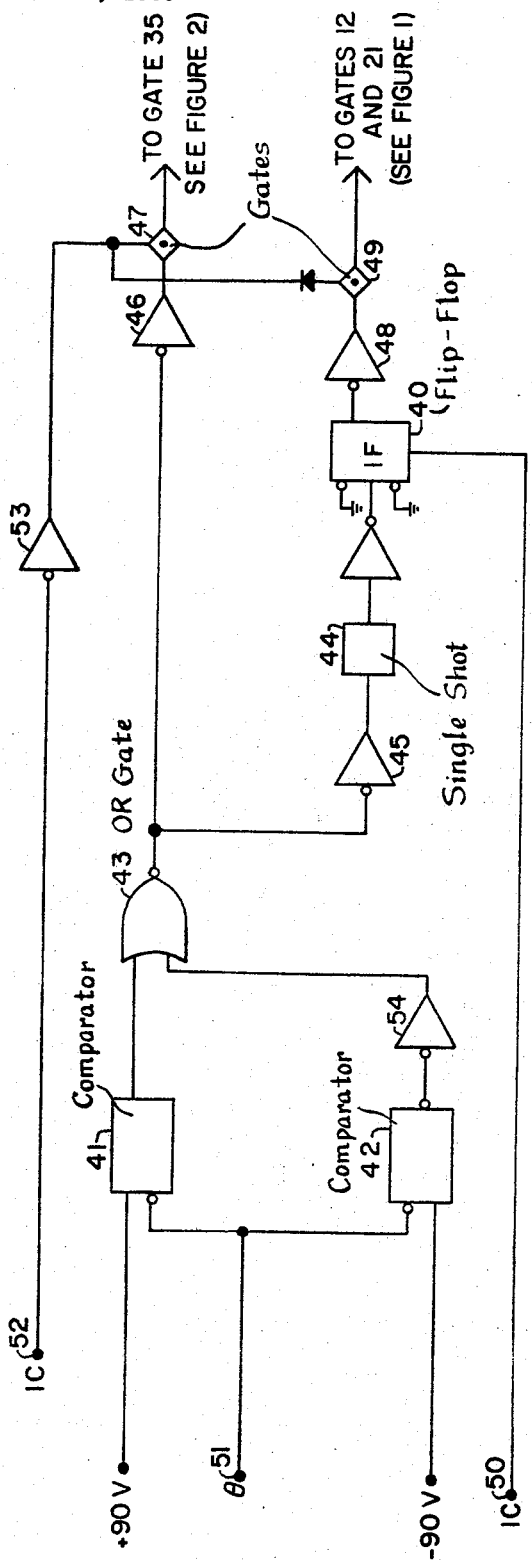
FIGURE 4 is a schematic diagram of the comparator circuitry of the present invention.

To more particularly describe the conditions under which electronic gates 12, 21, and 35 are placed in a conducting condition, reference is now made to FIGURE 4 which is a schematic diagram of the comparator circuit 14. When the computer is initially placed in the initial condition mode, flip-flop 40 of FIGURE 4 is preset by a signal received at terminal 50 to provide a low output voltage level of a two state binary signal, and this signal is inverted by inverter 48 to supply a binary high voltage signal to the respective gates 12 and 21 of FIGURE 1 which places these gates in a conducting condition. These respective gates will continue to conduct after the rate resolver of the present invention has been placed in operate mode until the voltage signal supplied to terminal 51 of FIGURE 4 from junction 16 of FIGURE 1 increases to +90 volts, at which time the condition is detected by comparator amplifier 41 and a low signal binary pulse is transmitted through OR gate 43 to inverter 45 to provide a pulse that triggers single shot multivibrator 44 to produce a 150 microsecond pulse that is amplified and presented to toggle flip-flop 40 to its opposite state. Since gates 12 and 21 of FIGURE 1 have been conducting during this time, these gates are now opened by the setting of flip-flop 40 as described in reference to FIGURE 1. As illustrated in FIGURE 3 by wave form A, the slope of the wave form output from integrator 11 now becomes negative, and the voltage at junction 16 of FIGURE 1 decreases until it reaches a −90 volts which condition is transmitted via terminal 51 of FIGURE 4 to comparator 42. In response thereto, a signal is again transmitted to single shot multivibrator 44 that in turn resets flip-flop 40 to present a low output signal which is inverted by invertor 48 to provide a high signal to again cause gates 12 and 21 of FIGURE 1 to conduct. This cycle continues as long as the computer is in operate mode. It will be noted that the output signal from inverter 48 is passed through gate 49 that is conditioned to conduct only when the computer is not in initial condition or I.C. mode. That is to say, whenever an I.C. signal is presented to terminal 52 this signal is inverted by inverter 53 to present a low signal to gate 49 thereby causing it to cease to conduct. When no I.C. signal is presented to terminal 52, a high signal is transmitted from inverter 53 to cause gate 49 to conduct.

More specifically, positive voltage comparator 41 will normally present a high output signal to OR gate 43 until the voltage supplied to terminal 51 from junction 16 of FIGURE 1 reaches +90 volts at which time the output from comparator 41 is switched to a low signal. In contrast to this, negative voltage comparator 42 normally presents a low output signal until the voltage presented to the terminal 51 equals −90 volts at which time the output of comparator 42 is switched to a high signal, which is inverted by inverter 54 to present a low signal to OR gate 43. Thus, the output signal from OR gate 43 will normally be a high binary signal or voltage level until comparator 41 switches to a low binary signal or comparator 42 switches to a high binary signal. When either condition happens, the output signal of OR gate 43 will then switch to a low binary signal which will be inverted by inverter 45 to toggle flip-flop 40.

More importantly, whenever the output signal of OR gate 43 changes to a low binary voltage level, this level is inverted by inverter 46 to produce a high binary signal that is transmitted via gate 47 to gate 35 of FIGURE 2. As in the case of gate 49, gate 47 is conducting except when the computer is in an initial condition mode. It will be remembered that the effect of placing gate 35 of FIGURE 2 in a conducting condition is to place resistor 36 of FIGURE 2 in parallel electrical connection with either capacitors 32 or 33 depending upon whether the computer is in an operating mode or a hold mode.

As will be understood by one skilled in the art, the effect of placing resistor 36 in parallel electrical connection with integrator 11, and specifically amplifier 31 thereof, is to change the gain of the amplifier and thus to change the output signal therefrom. More specifically, as has been described above, this effect is to partially discharge the capacitor in the feedback path of the integrator. Thus, each time the output voltage of the integrator reaches its positive or negative voltage limit, gate 35 will be placed in a conducting condition with a resultant reduction in the output signal of the integrator to some value less than its limiting value. As soon as this lesser value is achieved, gate 35 will be caused to cease to conduct by camparator 14. If the integrator circuitry has been placed in a hold condition, and the resultant drift of the output voltage exceeds the predetermined voltage limit, gate 35 will again be placed in a conducting condition to place resistor 36 in parallel electrical connection with the integrator until such time as that drift has been corrected and output voltage reduced. Gate 35 will then be caused to cease to conduct until such time as the output voltage has again reached the voltage limit at which time gate 35 will again be placed in conducting condition and so on.

It will be remembered that gate 35 is also placed in a conducting condition so place resistor 36 in parallel electrical connection with the integrator each time the integrator's output signal switches from a positive going ramp to a negative going ramp or from a negative going to a positive going ramp. That is to say, resistor 36 is placed in parallel electrical connection with the integrator each itme the rate resolver switches from one quadrant to another in its generation of a periodically varying function throughout a plurality of quadrants.

To achieve the appropriate corrective response each time the output signal of integrator reaches the prescribed voltage limits, resistor 36 is chosen to have a relatively high value compared to the electrical values of the other components in the circuit. When the electrical values of the other components in the circuitry are of the order of magnitude usually found in an integrator whose output voltage would vary between −90 volts and +90 volts, it has been found that the preferred value of resistor 36 is approximately 900K ohms. A resistance of this magnitude is sufficient to allow the integrator to quickly respond to the comparator circuitry without unduly shorting out the capacitor.

The present invention differs from standard limiting circuits made up of various diode networks in that the latter would merely serve to clamp the circuitry at some maximum voltage but would not serve to return the circuitry to its operational range. If such diode networks were employed in rate resolvers of the type disclosed and an unwanted voltage excursion were to occur, the diode networks would merely hold the circuitry at its maximum value and not allow the comparator circuitry to achieve quadrant switching as required.

Although only one particular embodiment of the present invention has been illustrated and described, it will be appreciated that variations and modifications will occur to one skilled in the art which variations and modifications nevertheless shall be determined to be within the spirit and scope of the invention as claimed.

What is claimed is:
1. A rate resolver circuit comprising;
an input terminal and at least one output terminal,
an electronic integrator having an output and inverting and non-inverting inputs, said inputs being connected to said input terminal,
first electrical gate means connected in said inverting input to control the application of said input to said integrator and thereby, the polarity of the first derivative of the integrator output,
second electrical gate means connected between said integrator output and said output terminal for controlling the polarity of the output signal at said terminal,
a resistance in series connection with third electrical gate means, the combination connected in parallel with said integrator for reducing the magnitude of the integrator output signal,
voltage source means for producing voltage reference signals of equal magnitude but of opposite polarity,
first and second comparator circuits connected to the output of said integrator and to respective ones of said reference signals for producing output indications whenever the magnitude of said integrator output exceeds said respective reference signals, and
means connected between said comparator circuits and said gates for controlling said gates upon occurrence of said output indications and thereby the polarity of the signal at said output terminal and the magnitude of said integrator output.

2. The rate resolver of claim 1, further including fourth electronic gate means connected to said first, second and third electronic gate means and to said comparator circuits for rendering said first, second and third electronic gate means un-responsive to said comparator output indications.

References Cited

UNITED STATES PATENTS

| | | | |
|---|---|---|---|
| 2,891,725 | 6/1959 | Blumenthal | 235—150.51 |
| 3,219,940 | 11/1965 | Cooke-Yarborough | 328—127 |
| 3,286,192 | 11/1966 | Collings | 307—229 |
| 3,296,613 | 1/1967 | Anderson | 235—183 |
| 3,351,837 | 11/1967 | Owen | 235—183 |

DONALD D. FORRER, Primary Examiner

D. M. CARTER, Assistant Examiner

U.S. Cl. X.R.

307—229; 235—183; 328—13